United States Patent [19]

Futter

[11] 4,381,116
[45] * Apr. 26, 1983

[54] FUTTER CHUCK

[76] Inventor: Friedrich P. Futter, 8250 Via Paseo del Norte, Apt. D-206, Scottsdale, Ariz. 85258

[*] Notice: The portion of the term of this patent subsequent to Aug. 8, 1998, has been disclaimed.

[21] Appl. No.: 220,304

[22] Filed: Dec. 29, 1980

Related U.S. Application Data

[63] Continuation-in-part of Ser. No. 36,501, May 7, 1979, Pat. No. 4,284,285.

[51] Int. Cl.³ .................. B23B 31/08; B23B 31/19
[52] U.S. Cl. ........................... 279/62; 279/1 B; 279/60
[58] Field of Search .............. 279/60, 62, 61, 28, 279/1 ME, 1 B

[56] References Cited

U.S. PATENT DOCUMENTS

| | | | |
|---|---|---|---|
| 310,987 | 1/1885 | Church | 279/60 |
| 1,396,022 | 11/1921 | Carriere | 279/60 |
| 4,284,285 | 8/1981 | Futter | 279/62 |

FOREIGN PATENT DOCUMENTS

| | | | |
|---|---|---|---|
| 588515 | 5/1947 | United Kingdom | 279/60 |
| 656192 | 8/1951 | United Kingdom | 279/60 |

*Primary Examiner*—William R. Briggs
*Attorney, Agent, or Firm*—William H. Drummond

[57] ABSTRACT

An improved chuck for holding an object such as a tool or work piece. The chuck includes circumferentially spaced jaws for grasping an object and a gear mechanism for adjusting the radial position of the jaws to grasp object of varying size. The jaws of the chuck are movable radially outwardly to an open position to permit insertion of an object there between and are adapted to move radially inwardly to an object grasping position. The improvements in the chuck include inclined key threads on the jaws; a rotatable jaw positioning collar around the jaws, including inclined, inwardly extending, circumferentially spaced key threads adapted to cooperatively engage and disengage the key threads on the jaws; a member positioned around the collar for engaging and rotating the collar to engage and disengage the key threads; and, a spring for normally yieldably urging the jaws axially outwardly and radially inwardly when the key threads are disengaged. The jaw positioning collar urges the jaws axially outwardly and radially inwardly to the object grasping position when the collar is rotated to engage the key threads, and permits free axial and radial movement of the jaws to the open position when the collar is rotated to disengage the key threads.

1 Claim, 4 Drawing Figures

FUTTER CHUCK

This is a continuation-in-part of my copending United States application for "THE FUTTER CHUCK, AN IMPROVED ROTARY CHUCK," Ser. No. 36,501, filed May 7, 1979 now issued U.S. Pat. No. 4,284,285.

This invention relates to an improved chuck for holding an object such as a tool or work piece.

More particularly, the invention relates to a chuck of the type having circumferentially spaced jaws which move axially and radially and having a gearing mechanism to engage and inwardly or outwardly urge the jaws.

In another aspect, the invention concerns a chuck of the type described which does not require the insertion and rotation of a conventional chuck key to operate the gearing mechanism that inwardly and outwardly displaces the jaws of the chuck.

In still another respect, the invention concerns a chuck in which the jaws of the chuck automatically move into engagement with the outer surfaces of a work piece inserted in between the jaws.

In yet a further respect, the invention relates to a chuck of the type described in which a rotatable jaw positioning collar having inwardly extending circumferentially spaced key threads engages and forces the jaws into locking engagement with a work piece inserted between the jaws.

The Jacob's chuck, an oblique reciprocating jaw chuck, has been utilized by generations of craftsmen. The chuck includes circumferentially spaced jaws which can be moved radially and axially, outwardly or inwardly, by turning a key which is inserted in the chuck and engages gearing operatively associated with the jaws. A work piece is secured in the chuck by inserting a portion of the work piece in between outwardly opened jaws and by then turning the key to radially and axially inwardly move the jaws against the work piece.

Although adjusting the jaws of the Jacob's and other similar prior art chucks by inserting and rotating the chuck key is a simple operation, several time consuming and potentially dangerous disadvantages are associated with the use of such prior art chucks. First, the adjustment key must normally be removed from the chuck before the motor which rotates the chuck and the work piece secured in the chuck is started, otherwise the centrifugal force generated by the rotating chuck would throw the key from the chuck such that the key could strike and injure the individual using the chuck. Such injuries can be minor, or, as has been demonstrated by those cases in which a key thrown from a turning chuck has caused an individual's loss of sight, can be very serious. A fairly recent design improvement eliminates this problem by requiring that the key, after being used to secure a work piece between the jaws, be repositioned as an interlocked device before the chuck driven motor can be started.

Second, chuck keys are readily misplaced. After undergoing the aggravation of locating a temporarily misplaced key an individual has a greater tendency to forget to remove the chuck key before starting the chuck motor and to consequently be injured. Another disadvantage associated with prior art chucks is that when work is being performed which requires a number of different sized work pieces, having to repeatedly utilize the chuck key to remove one work piece and then insert and secure another in the chuck jaws is time consuming.

Accordingly, it would be highly desirable to provide an improved chuck of the type described which did not require the insertion and rotation of a conventional chuck key to operate the gearing mechanism that inwardly and outwardly urges the jaws of the chuck.

Therefore, it is a principle object of the present invention to provide an improved chuck.

Another principle object of the invention is to provide an improved chuck of the type having circumferentially spaced jaws which move axially and radially and having a gearing mechanism to engage and inwardly or outwardly urge the jaws.

A further object of the instant invention is to provide an improved chuck of the type described which does not require the utilization of a conventional chuck key to operate the gearing mechanism which separates and retracts the jaws.

Another and more specific object of the present invention is to provide a chuck having jaws which automatically engage the surface of a work piece inserted between the jaws.

These and other, further and more specific objects and advantages of the invention will be apparent to those skilled in the art from the following detailed description thereof, taken in conjunction with the drawings, in which.

Briefly, in accordance with my invention, I provide an improved chuck for releasably holding an object such as a tool or work piece. The chuck includes circumferentially spaced jaws for grasping an object and means for adjusting the jaws to grasp objects of varying size. The jaws are movable radially outwardly to an open position to permit insertion of an object there between and are adapted to move radially inwardly to an object grasping position. The improvements in the chuck comprise inclined key threads on the jaws; a rotatable jaw positioning collar around the jaws, including inclined, inwardly extending, circumferentially spaced key threads adapted to cooperatively engage and disengage the key threads on the jaws; collar means positioned around the collar for engaging and rotating the collar to engage and disengage the key threads; and means for normally yieldably urging the jaws axially outwardly and radially inwardly when the key threads are disengaged. The rotatable collar urges the jaws axially outwardly and radially inwardly to the object grasping position when the collar is rotated to engage the key threads and, permits free axial and radial movement of the jaws to the open position when the collar is rotated to disengage the key threads.

Figure 1:
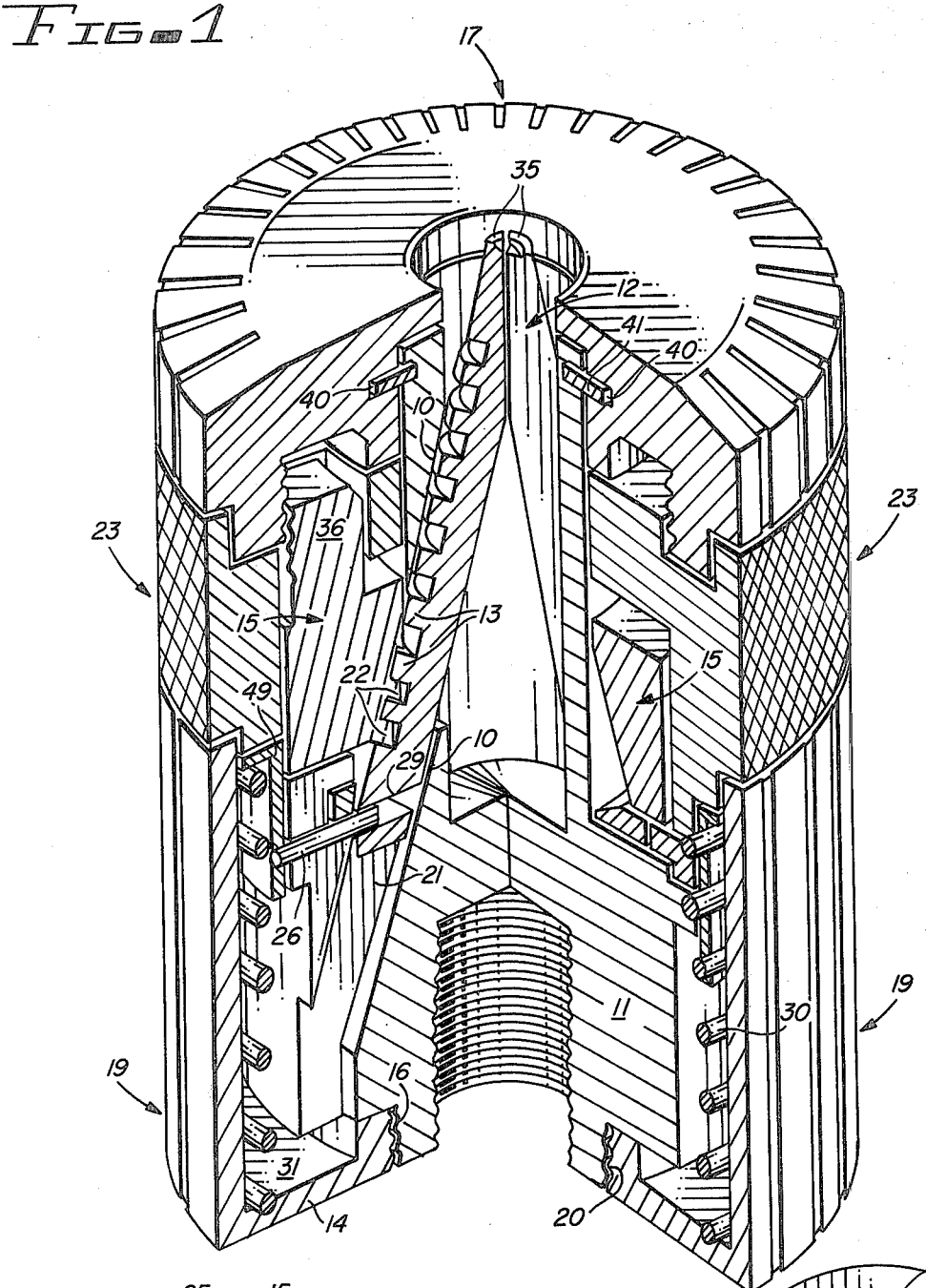
FIG. 1 is a perspective view of a chuck constructed in accordance with the principles of the invention having the outer portion thereof broken away to further illustrate the interior construction thereof.
Figure 3:
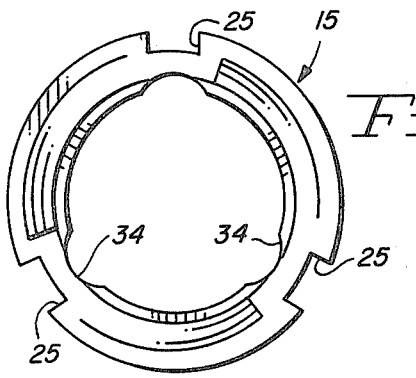
FIG. 3 is a sectional view of one of the components of the chuck of FIG. 2 taken along section line 3—3 thereof; and, FIG. 4 is a sectional view of one of the components of the chuck of FIG. 2 taken along section line 4—4 thereof.
Figure 4:
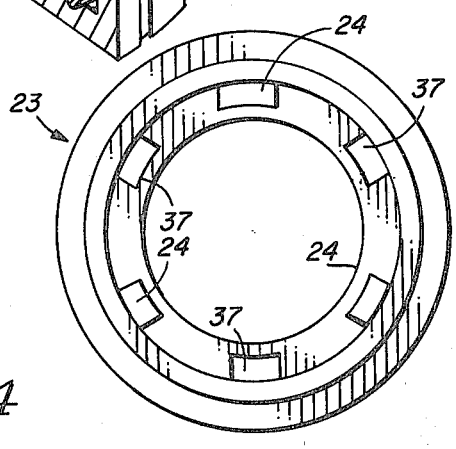
Figure 2:
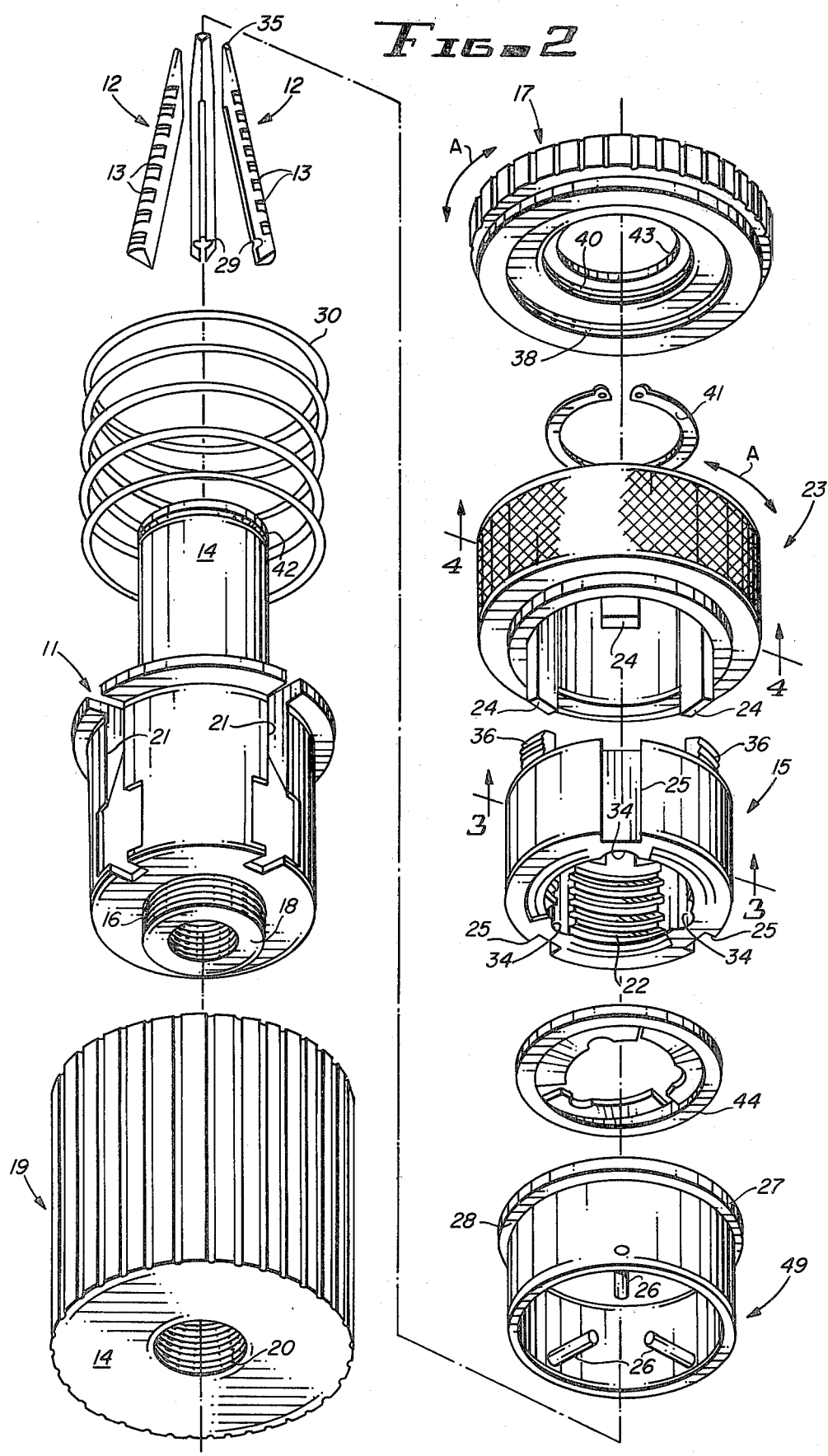
FIG. 2 is an assembly view of the chuck of FIG. 1, showing further details of the invention.

Turning now to the drawings, which depict the presently preferred embodiment of the invention for the purpose of illustrating the practice thereof and not by way of limitation of the scope of the invention and in which like reference characters illustrate corresponding elements throughout the several views, FIGS. 1–4 illustrate a chuck and the components thereof including jaws 12 provided with inclined key threads 13. Jaws 12 are received within hollow cylindrical neck 14 of head member 11 and slidably extend through aperture 10 in neck 14 and into oblique grooves 21 formed in head member 11. External threads 16 of the nose 18 of head member 11 are detachably fixedly received by internally threaded aperture 20 of bottom cap 19.

Key threads 22 of rotary ring 15 cooperatively engage those key threads 13 of jaws 12 which are located on the portions of jaws 12 extending past apertures 10 to the outside of neck 14. Feet 24 of collar 23 are slidably received by slots 25 formed in the circumference of rotary ring 15 so that rotation of collar 23 causes ring 15 to rotate and to upwardly or downwardly displace jaws 12.

Jaw adjustment control ring 49 includes depending inwardly projecting pins 26 and outwardly projecting lip 27 having lower circumferential surface 28. Pins 26 are slidably received in apertures 29 formed in jaws 12. Elastic spring 30 expands against the upper surface 31 of floor 14 of bottom cap 19 and against the lower surface 28 of lip 27 of control ring 13. When ring 15 is rotated so that teeth 22 are disengaged from teeth 13 of jaws 12 and jaws 12 are instead positioned within grooves 34 formed on the interior of ring 15, jaws 12 are free to slidably move along slots 21 of head member 11. After teeth 22 of ring 15 are disengaged from jaws 12, spring 30 normally yieldably urges jaw adjustment ring 49 upwardly causing jaws 12 to move axially outwardly and radially inwardly until jaws 12 abut against one another.

Applying a downward force against noses 35 of jaws 12 will, when the downward force is sufficient to overcome the opposing upward force generated by spring 30 when jaws 12 are disengaged from teeth 22 of ring 15, displace jaws 12 axially inwardly and radially outwardly and will downwardly displace ring 49 and compress spring 30. Thus, when teeth 22 are disengaged from teeth 13 of jaws 12, after jaws 12 are downwardly displaced and a work piece inserted there between, spring 30 causes the jaws to automatically travel axially outwardly and radially inwardly and to close against and grasp the outer surface of the work piece.

Externally threaded arms 36 of ring 15 are received by and pass through openings 37 in collar 23 and engage threads 38 formed on the interior of cap 17. Slot 40 of cap 17 slidably receives a portion of ring 41. Ring 41 snaps into circumferential slot 42 formed around neck 14 of head 11. A shoulder formed under circular opening 43 of cap 17 receives the top portion of neck 14.

When key threads 22 of ring 15 are engaging key threads 13 of jaws 12, jaws 12 can be axially and radially displaced by rotating either cap 17 or collar 23 about the central elongate axis of the chuck in the directions of arrows A. Spring 44 is positioned around neck 14 and acts as a stop for the ring 15 when the jaws 12 are aligned with grooves 34 in an open position.

Rotary ring 15, collar 23 and cap 17 provide, in comparison to the lever-latch-rack gear system of my earlier filed copending United States application, Ser. No. 36,501, a substantially improved and simplified manually operated system for continuously adjusting jaws 12. The ability to adjust jaws 12 by simply turning an outer sleeve of the chuck facilitates the insertion of a tool or work piece in the chuck.

Having described my invention in such terms as to enable those skilled in the art to understand and practice it, and having identified the presently preferred embodiment thereof, I claim:

1. In a chuck for releasably holding an object such as a tool or work piece, including
    circumferentially spaced jaws for grasping said object which are
        movable radially outwardly to an open position to permit insertion of said object therebetween, and
        adapted to move radially inwardly to an object-grasping position,
    and
    means for adjusting the radial position of said jaws to grasp objects of varying size,
the improvements comprising:
    (a) inclined key threads on said jaws;
    (b) a rotatable jaw-positioning collar around said jaws, including inclined, inwardly extending, circumferentially spaced key threads adapted to cooperatively engage and disengage the key threads on said jaws, which collar
        (i) urges said jaws axially outwardly and radially inwardly to said object-grasping position when said collar is rotated to engage said key threads, and
        (ii) permits free axial and radial movement of said jaws to said open position when said collar is rotated to disengage said key threads;
    (c) collar rotating means positioned around said collar for engaging and rotating said collar to engage and disengage said key threads; and
    (d) means for normally yieldably urging said jaws axially outwardly and radially inwardly when said key threads are disengaged.

* * * * *